(12) United States Patent
Keeling et al.

(10) Patent No.: US 9,583,259 B2
(45) Date of Patent: *Feb. 28, 2017

(54) WIRELESS POWER TRANSFER DEVICE AND METHOD OF MANUFACTURE

(71) Applicant: QUALCOMM Incorporated, San Diego, CA (US)

(72) Inventors: Nicholas A Keeling, Auckland (NZ); Edward Van Boheemen, Auckland (NZ); Michael Kissin, Auckland (NZ); Jonathan Beaver, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 1008 days.

This patent is subject to a terminal disclaimer.

(21) Appl. No.: 13/671,469

(22) Filed: Nov. 7, 2012

(65) Prior Publication Data

US 2013/0249304 A1 Sep. 26, 2013

Related U.S. Application Data

(60) Provisional application No. 61/613,418, filed on Mar. 20, 2012.

(51) Int. Cl.
*H01F 38/14* (2006.01)
*H01F 41/00* (2006.01)
(Continued)

(52) U.S. Cl.
CPC ............. *H01F 38/14* (2013.01); *B60L 11/182* (2013.01); *H01F 27/022* (2013.01); *H01F 41/00* (2013.01);
(Continued)

(58) Field of Classification Search
None
See application file for complete search history.

(56) References Cited

U.S. PATENT DOCUMENTS 3,902,147 A 8/1975 Trench
4,234,865 A 11/1980 Shigehara
(Continued)

FOREIGN PATENT DOCUMENTS

CN 1411009 A 4/2003
CN 1950914 A 4/2007
(Continued)

OTHER PUBLICATIONS

English Machine Translation of DE102010050935.*
(Continued)

*Primary Examiner* — Rexford Barnie
*Assistant Examiner* — David Shiao
(74) *Attorney, Agent, or Firm* — Knobbe Martens Olson & Bear LLP

(57) ABSTRACT

Methods and apparatuses for wireless power transfer, and particularly, wireless power transfer to remote systems such as electric vehicles are disclosed. In one aspect, a wireless power transfer device is provided comprising a casing housing at least one component, with a first portion of the casing containing a set first flowable medium, and a second portion of the casing containing a second set flowable medium having a different density to that of the first set flowable medium. The casing can include a locating portion, with the locating portion in contact with a flowable medium set within the casing. In another aspect, a method of manufacturing a wireless power transfer device is provided. During manufacturing, a casing of the device may be loaded to maintain a desired shape while at least one component and a settable flowable medium are introduced into the casing.

26 Claims, 8 Drawing Sheets

(51) Int. Cl.
*B60L 11/18* (2006.01)
*H02J 7/00* (2006.01)
*H01F 27/02* (2006.01)

(52) U.S. Cl.
CPC ........... *H01F 41/005* (2013.01); *H02J 7/0042* (2013.01); *Y02T 10/7005* (2013.01); *Y02T 10/7072* (2013.01); *Y02T 90/122* (2013.01); *Y02T 90/14* (2013.01); *Y10T 29/4902* (2015.01)

(56) References Cited

U.S. PATENT DOCUMENTS

| | | | |
|---|---|---|---|
| 4,538,863 A * | 9/1985 | Allen | H01F 38/14 439/39 |
| 4,605,818 A | 8/1986 | Arroyo et al. | |
| 4,623,865 A | 11/1986 | Kiesel et al. | |
| 4,800,328 A * | 1/1989 | Bolger | B60L 5/005 191/10 |
| 6,198,373 B1 * | 3/2001 | Ogawa | H01F 17/0033 336/83 |
| 6,239,682 B1 | 5/2001 | McCloskey | |
| 6,333,573 B1 | 12/2001 | Nakamura | |
| 6,768,409 B2 * | 7/2004 | Inoue | H01F 17/0013 29/602.1 |
| 6,784,778 B2 | 8/2004 | Stitz et al. | |
| 6,794,975 B2 * | 9/2004 | Iwao | H01F 38/14 336/90 |
| 7,154,204 B2 | 12/2006 | Koenig | |
| 7,280,022 B2 | 10/2007 | Shinmen et al. | |
| 7,595,571 B2 | 9/2009 | Thirunarayan-Kumar et al. | |
| 7,986,059 B2 | 7/2011 | Randall | |
| 8,035,255 B2 | 10/2011 | Kurs et al. | |
| 8,042,742 B2 * | 10/2011 | Kagaya | G06K 19/07718 235/492 |
| 8,174,234 B2 | 5/2012 | Julstrom et al. | |
| 8,525,868 B2 | 9/2013 | Forutanpour et al. | |
| 8,928,445 B2 | 1/2015 | Mori et al. | |
| 2004/0124958 A1 | 7/2004 | Watts et al. | |
| 2006/0104006 A1 | 5/2006 | Saito | |
| 2006/0133622 A1 | 6/2006 | Chen | |
| 2007/0222426 A1 | 9/2007 | Waffenschmidt et al. | |
| 2007/0287508 A1 | 12/2007 | Telefus | |
| 2008/0129246 A1 | 6/2008 | Morita et al. | |
| 2009/0096413 A1 | 4/2009 | Partovi et al. | |
| 2009/0160262 A1 * | 6/2009 | Schmidt | H01F 27/2847 307/104 |
| 2009/0273242 A1 | 11/2009 | Cook | |
| 2009/0289752 A1 | 11/2009 | Akimoto | |
| 2010/0264872 A1 | 10/2010 | Kwong | |
| 2010/0277121 A1 | 11/2010 | Hall et al. | |
| 2010/0314946 A1 | 12/2010 | Budde et al. | |
| 2011/0062806 A1 | 3/2011 | Ohashi et al. | |
| 2011/0140539 A1 | 6/2011 | Yamamoto et al. | |
| 2011/0162881 A1 | 7/2011 | Schipporeit | |
| 2011/0187317 A1 | 8/2011 | Mitake et al. | |
| 2011/0234028 A1 * | 9/2011 | Iwasaki | H02K 9/22 310/52 |
| 2011/0316475 A1 | 12/2011 | Jung et al. | |
| 2012/0020485 A1 | 1/2012 | Visser et al. | |
| 2012/0026837 A1 | 2/2012 | Li et al. | |
| 2012/0074899 A1 | 3/2012 | Tsai et al. | |
| 2012/0091950 A1 | 4/2012 | Campanella et al. | |
| 2012/0119698 A1 | 5/2012 | Karalis et al. | |
| 2012/0161696 A1 | 6/2012 | Cook et al. | |
| 2012/0224456 A1 | 9/2012 | Visser et al. | |
| 2013/0249303 A1 | 9/2013 | Keeling et al. | |
| 2013/0249477 A1 | 9/2013 | Keeling et al. | |
| 2013/0300202 A1 | 11/2013 | Keeling et al. | |
| 2016/0027577 A1 | 1/2016 | Keeling et al. | |

FOREIGN PATENT DOCUMENTS

| | | |
|---|---|---|
| CN | 101454957 A | 6/2009 |
| CN | 101490923 A | 7/2009 |
| CN | 102089952 A | 6/2011 |
| DE | 19839458 | 3/2000 |
| DE | 102006025458 A1 | 12/2007 |
| DE | 102010050935 A1 | 9/2011 |
| EP | 1298683 A2 | 4/2003 |
| JP | 2001008380 A * | 1/2001 |
| WO | 2009123432 A2 | 10/2009 |
| WO | WO-2009151818 | 12/2009 |
| WO | 2010090538 A1 | 8/2010 |
| WO | 2010090539 A1 | 8/2010 |

OTHER PUBLICATIONS

English Machine Translation of DE19839458.*
English Machine Translation of JP2001008380.*
English Machine Translation of DE102010050935 published Sep. 29, 2011.*
English Machine Translation of DE19839458 published Mar. 9, 2000.*
English Machine Translation of JP2001008380 published Jan. 12, 2001.*
International Search Report and Written Opinion—PCT/US2013/029383—ISA/EPO—Oct. 9, 2013.
Wikipedia : "Heat-shrink Tubing", as published Mar. 10, 2012, retrieved via archive.org/web at <http://web.archive.Org/web/20120310052307/http://en.wikipedia.org/wiki/Heat-shrink_tubing>, 3 pages.

* cited by examiner

WIRELESS POWER TRANSFER DEVICE
AND METHOD OF MANUFACTURE

CROSS-REFERENCE TO RELATED
APPLICATIONS

This is a non-provisional application claiming priority to and the benefit of U.S. Provisional Application No. 61/613,418, filed Mar. 20, 2012, which is herein incorporated by reference in its entirety.

TECHNICAL FIELD

The technical field relates generally to wireless power transfer, and more specifically to devices, systems, and methods related to wireless power transfer to remote systems such as battery-powered vehicles. More particularly, the field relates to arrangements for manufacture of wireless power transfer devices used in wireless power transfer systems.

BACKGROUND

Remote systems, such as vehicles, have been introduced that include locomotion power derived from electricity received from an energy storage device such as a battery. For example, hybrid electric vehicles include on-board chargers that use power from vehicle braking and motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks.

Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles are desirable.

Wireless power transfer systems may utilize inductive power transfer (IPT) to transfer power between base and pickup power devices. In the context of vehicle use, the devices may be positioned on the ground and therefore subject to harsh conditions both in terms of impact and compressive forces (particularly from being driven over) and also in terms of exposure to the elements, especially water. Protection of the devices may be accomplished by using thick shielding in the construction of the device to increase mechanical strength, or by embedding the base device in the ground. However, it is generally desirable to reduce the physical footprint of the device for the purposes of both aesthetic appeal and ease of mounting. It is also desirable to minimize the degree of shielding between the base and pickup devices to reduce effects on power transfer. Further, it can be desirable to reduce the weight of the devices—particularly those mounted to vehicles.

SUMMARY

Various implementations of systems, methods, and devices within the scope of the appended claims each have several aspects intended to address at least one of the foregoing objectives, with no single aspect being solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure relates to a wireless power transfer device. The device of some embodiments includes, for example, a casing, a coil configured to wirelessly receive and transmit power housed within the casing, and a set first flowable medium contained in a first portion of the casing surrounding at least part of the coil. In some embodiments, a second portion of the casing includes a set second flowable medium having a different density than that of the first set flowable medium. In some embodiments, the device further includes a magnetically permeable member. At least part of the magnetically permeable member is held within the set second flowable medium. In some embodiments, the casing includes a locating portion in contact with the set first flowable medium. In some such embodiments, the locating portion is an undercutting portion. In other embodiments, the locating portion is an aperture in the casing. In still other embodiments, the locating portion is a protrusion in the casing. The casing of some embodiments is made of a substantially chemically resistant material. In some embodiments, the casing is made of polyethylene.

Another aspect of the disclosure provides a method of manufacturing a wireless power transfer device, the device including a casing and a coil housed within the casing. The coil of various embodiments is configured to wirelessly receive and transmit power. The method of some embodiments includes, for example, introducing the coil into the casing, introducing a first flowable medium into the casing, and causing the first flowable medium to set and form a set first flowable medium occupying a first portion of the casing surrounding at least part of the coil. In some embodiments, the first flowable medium substantially fills the casing. In some embodiments, the first flowable medium is epoxy resin. In some embodiments, the casing of the wireless power transfer device includes a locating portion, which is in contact with the set first flowable medium once the first flowable medium has set.

In some embodiments, the method further includes introducing a second flowable medium into the casing and causing the second flowable medium to set and form a set second flowable medium occupying a second portion of the casing. In various embodiments, the second flowable medium is of a different density than that of the first flowable medium. In some such embodiments, the second flowable medium is of a lower density than the first flowable medium. The second flowable medium of some embodiments is epoxy resin mixed with a second material of a lower density than the epoxy resin. In some embodiments, the second flowable medium is introduced after the first flowable medium has set. In some embodiments, the first flowable medium and second flowable medium together substantially fill the casing. In some embodiments of the method, the wireless power transfer device includes a magnetically permeable member. Further, in some such embodiments, the method includes introducing the first flowable medium into the casing such that upon setting of the first flowable medium, the coil is held within the set first flowable medium. The method of such embodiments also includes introducing the second flowable medium into the casing and causing the second flowable medium to set such that at least part of the magnetically permeable member is held within the set second flowable medium. In some embodiments, part of the magnetically permeable member is held within the set first flowable medium. In other embodiments, the magnetically permeable member is encased by the set second flowable medium. In still other embodiments, the magnetically permeable member is encased by both the set first flowable medium and the set second flowable medium.

In accordance with another aspect, a method of manufacturing a wireless power transfer device is provided wherein the manufactured device includes a casing and a coil housed within the casing. The method of one embodiment includes, for example, applying a force to the casing to maintain a desired shape, introducing the coil into the casing, introducing a medium in a flowable form into the casing such that upon setting of the medium, the coil is at least partially held within the medium, and removing the applied force from the casing upon setting of the medium. In some embodiments, the force is applied to a protrusion extending from an interior of the casing. In other embodiments, the force is applied to the casing by applying a vacuum to an exterior of the casing. In some embodiments, the medium in a set form maintains the shape of the casing on removal of the applied force.

BRIEF DESCRIPTION OF THE DRAWINGS

These and/or other aspects will become apparent and more readily appreciated from the following drawings, which taken in conjunction with the specification of the present application, serve to explain the principles of the present disclosure.

Figure 1:
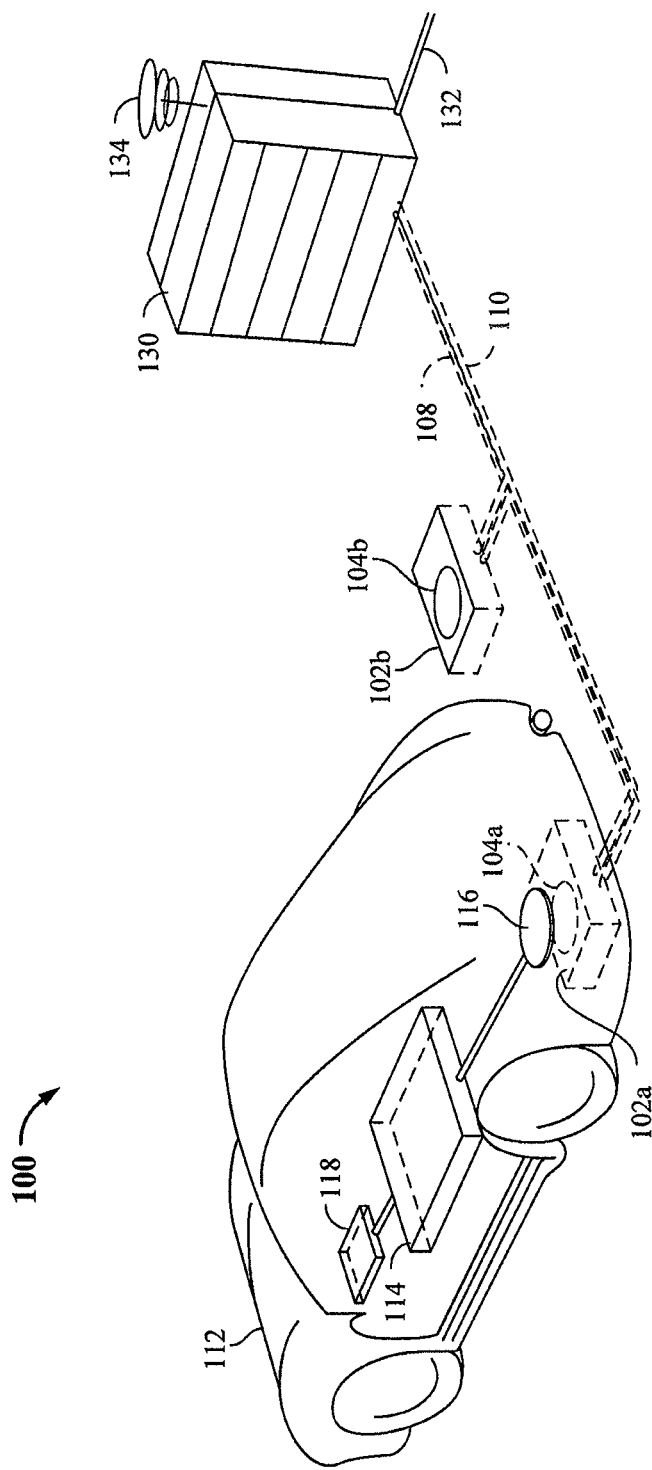
FIG. 1 is a perspective view of an exemplary wireless power transfer system for charging an electric vehicle, in accordance with an exemplary embodiment.

The various features illustrated in the drawings may not be drawn to scale. Accordingly, the dimensions of the various features may be arbitrarily expanded or reduced for clarity. In addition, some of the drawings may not depict all of the components of a given system, method or device.

DETAILED DESCRIPTION OF CERTAIN EMBODIMENTS

In the following detailed description, reference is made to the accompanying drawings, which form a part of the present disclosure. In the drawings, similar symbols typically identify similar components, unless context dictates otherwise. The illustrative embodiments described in the detailed description, drawings, and claims are not meant to be limiting. The detailed description set forth below in connection with the appended drawings is intended as a description of exemplary embodiments and is not intended to represent the only embodiments which may be practiced. The term "exemplary" used throughout this description means "serving as an example, instance, or illustration," and should not necessarily be construed as preferred or advantageous over other embodiments. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

The terminology used herein is for the purpose of describing particular embodiments only and is not intended to be limiting of the disclosure. It will be understood by those within the art that if a specific number of a claim element is intended, such intent will be explicitly recited in the claim, and in the absence of such recitation, no such intent is present. For example, as used herein, the singular forms "a", "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received by, captured by, or coupled by a "receiving coil" to achieve power transfer. Accordingly, the terms "wireless" and "wirelessly" are used to indicate that power transfer between charging station and remote system is achieved without use of a cord-type electric conductor therebetween.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices, mobile phones, and the like).

FIG. 1 is a diagram of an exemplary wireless power transfer system 100 for charging an electric vehicle 112, in accordance with an exemplary embodiment. The wireless power transfer system 100 enables charging of an electric vehicle 112 while the electric vehicle 112 is parked near a base wireless charging system 102a. Charging spaces for two electric vehicles are illustrated in a parking area. Each charging space is configured such that an electric vehicle can drive into the charging space and park over a base wireless charging system, such as base wireless charging systems 102a and 102b. In some embodiments, a local distribution center 130 may be connected to a power backbone 132 and configured to provide an alternating current (AC) or a direct current (DC) supply through a power link 110 to the base wireless charging system 102b. The power link may be an electric cable, cord, wire, or other device for transporting power along a distance. In some embodiments, power backbone 132 supplies power via power link 110 to one base wireless charging system; in other embodiments, the power backbone 132 may supply power via power link 110 to two or more base wireless charging systems. Thus, in some embodiments, power link 110 extends beyond base wireless charging system 102b, delivering power to additional base wireless charging systems, such as base wireless charging system 102a. While the description hereinafter refers to base wireless charging system 102a and its various components, the description is also applicable to base wireless charging system 102b and to any additional base wireless charging systems included within a wireless power transfer system 100.

Local distribution 130 may be configured to communicate with external sources (e.g., a power grid) via a communication backhaul 134, and with all base wireless charging systems, such as, for example, base wireless charging systems 102a via a communication link 108. Communication link 108 may include one or more cables or other devices for transporting signals along a distance.

The base wireless charging system 102a of various embodiments includes a base system induction coil 104a for wirelessly transferring or receiving power. When an electric vehicle 112 is within range of the base wireless charging system 102a, power may be transferred between the base wireless induction coil 104a and an electric vehicle induction coil 116 within the electric vehicle 112. In some embodiments, power may be transmitted from the base wireless induction coil 104a to the electric vehicle induction coil 116. Power received by the electric vehicle induction coil 116 can then be transported to one or more components within the electric vehicle 112 to provide power to the electric vehicle 112. Such components within the electric vehicle 112 include, for example, a battery unit 118 and an electric vehicle wireless charging system 114.

In some exemplary embodiments, the electric vehicle induction coil 116 is said to be within range of, and may receive power from, the base system induction coil 104a when the electric vehicle induction coil 116 is located within a target region of the electromagnetic field generated by the base system induction coil 104a. The target region corresponds to at least part of a region where energy output by the base system induction coil 104a may be captured by an electric vehicle induction coil 116. In some cases, the target region may correspond to the "near-field" of the base system induction coil 104a. The near-field is at least part of the electromagnetic field produced by the base system induction coil 104a. The near-field may correspond to a region in which there are strong reactive fields that result from the currents and charges in the base system induction coil 104a and that do not radiate power away from the base system induction coil 104a. In some cases, the near-field may correspond to a region that is within approximately $\frac{1}{2}\pi$ of the wavelength of the base system induction coil 104a. Additionally, in various embodiments, described in more detail below, power may be transmitted from the electric vehicle induction coil 116 to the base system induction coil 104a. In such embodiments, the near-field may correspond to a region that is within approximately $\frac{1}{2}\pi$ of the wavelength of the electric vehicle induction coil 116.

In various embodiments, aligning the electric vehicle induction coil 116 such that it is disposed within the near-field region of the base system induction coil 104a may advantageously improve or maximize power transfer efficiency. In some embodiments, the electric vehicle induction coil 116 may be aligned with the base system induction coil 104a, and therefore, disposed within the near-field region simply by the driver properly aligning the electric vehicle 112 relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations, thereby improving convenience to a user. There may also be no exposed electrical contacts and no mechanical wear out, thereby improving reliability of the wireless power transfer system 100. Manipulations with cables and connectors can be avoided, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
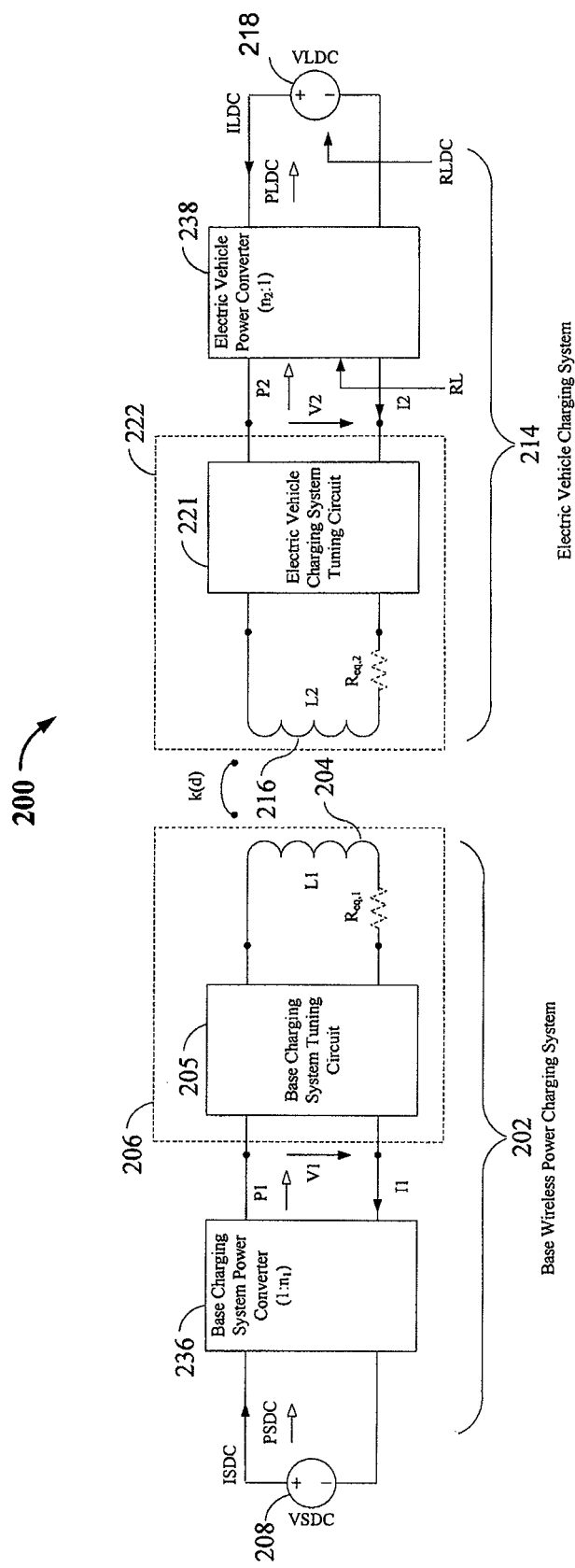
FIG. 2 is a schematic diagram of exemplary components of the wireless power transfer system of FIG. 1.

FIG. 2 is a schematic diagram of exemplary components of the wireless power transfer system 100 of FIG. 1. As shown in FIG. 2, the wireless power transfer system 200 may include a base wireless power charging system 202, which includes a base system transmit circuit 206 having a base system induction coil 204 with an inductance $L_1$. The wireless power transfer system 200 further includes an electric vehicle charging system, which includes an electric vehicle receive circuit 222 having an electric vehicle induction coil 216 with an inductance $L_2$. Certain embodiments described herein may use capacitively loaded wire loops (i.e., multi-turn coils) to form a resonant structure that is capable of efficiently coupling energy from a primary structure (transmitter) to a secondary structure (receiver) via a magnetic or electromagnetic near-field if both primary and secondary are tuned to a common resonant frequency. In some such embodiments, the electric vehicle induction coil 216 and the base system induction coil 204 may each comprise multi-turn coils. Using resonant structures for coupling energy may be referred to as "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206, including to a base charging system tuning circuit 205 which may include reactive tuning components in a series or parallel configuration or a combination of both and the base system induction coil 204, to emit an electromagnetic field at a desired frequency. In one embodiment, a capacitor may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206, including base system induction coil 204, and the electric vehicle receive circuit 222, including electric vehicle induction coil 216, may be tuned to substantially the same frequencies and may be positioned within the near-field of an electromagnetic field transmitted by one of the base system induction coil 204 and the electric vehicle induction coil 216. In this case, the base system induction coil 204 and electric vehicle induction coil 216 may become coupled to one another through the electromagnetic field therebetween such that power may be transferred to the electric vehicle receive circuit 222, including to an electric vehicle charging system tuning circuit 221 and electric vehicle induction coil 216. The electric vehicle charging system tuning circuit 221 may be provided to form a resonant circuit with the electric vehicle induction coil 216 so that electric vehicle induction coil 216 resonates at a desired frequency. The mutual coupling coefficient resulting at coil separation is represented by k(d). Equivalent resistances $R_{eq,1}$ and $R_{eq,2}$ represent the losses that may be inherent to the induction coils 204 and 216 and any anti-reactance capacitors that may, in some embodiments, be provided in the base charging system tuning circuit 205 and electric vehicle charging system tuning circuit 221 respectively. The electric vehicle receive circuit 222, including the electric vehicle induction coil 216 and electric vehicle charging system tuning circuit 221, receives power $P_2$ from the base wireless power charging system 202 via the electromagnetic field between induction coils 204 and 216. The electric vehicle receive circuit 222 then provides the power $P_2$ to an electric vehicle power converter 238 of an electric vehicle charging system 214 to enable usage of the power by the electric vehicle 112.

The electric vehicle power converter 238 may include, among other things, an LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of a battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 202 (acting as a transmitter), which may be used to decouple the electric vehicle charging system 214 (acting as the receiver) from the base wireless charging system 202. The load changes may be detected if the transmitter includes the load sensing circuit. Accordingly, the transmitter, such as a base wireless charging system 202, may have a mechanism for determining when receivers, such as an electric vehicle charging system 214, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 216 are configured according to a mutual resonant relationship such that the resonant frequency of the electric vehicle induction coil 216 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near-field of a transmitting induction coil to a receiving induction coil rather than propagating most of the energy in an electromagnetic wave beyond the near-field. When in the near-field, a coupling mode may be established between the transmit induction coil and the receive induction coil. The area around the induction coils where this near-field coupling may occur is referred to herein as a near-field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204, as described throughout the disclosed embodiments, may be referred to or configured as "loop" antennas, and more specifically, multi-turn loop antennas. The induction coils 204 and 216 may also be referred to herein or be configured as "magnetic" antennas. The term "coils" is intended to refer to a component that may wirelessly output or receive energy for coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near-field of the transmitting induction coil to the receiving induction coil residing within a region (e.g., within a predetermined frequency range of the resonant frequency, or within a predetermined distance of the near-field region) where this near-field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil (e.g., induction coil 204) to create a resonant structure at a desired resonant frequency. As a non limiting example, a capacitor (not shown) may be added in series with the induction coil (e.g., induction coil 204) to create a resonant circuit (e.g., the base system transmit circuit 206) that generates an electromagnetic field. Accordingly, for larger diameter induction coils, the value of capacitance for inducing resonance may decrease as the diameter or inductance of the coil increases. Inductance may also depend on a number of turns of an induction coil. Furthermore, as the diameter of the induction coil increases, the efficient energy transfer area of the near-field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil.

As described above, according to some embodiments, coupling power between two induction coils that are in the near-field of one another is disclosed. As described above, the near-field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi-turn loop antennas, are used for both transmitting and receiving since magnetic near-field amplitudes in practical embodiments tend to be higher for magnetic type coils in comparison to the electric near-fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
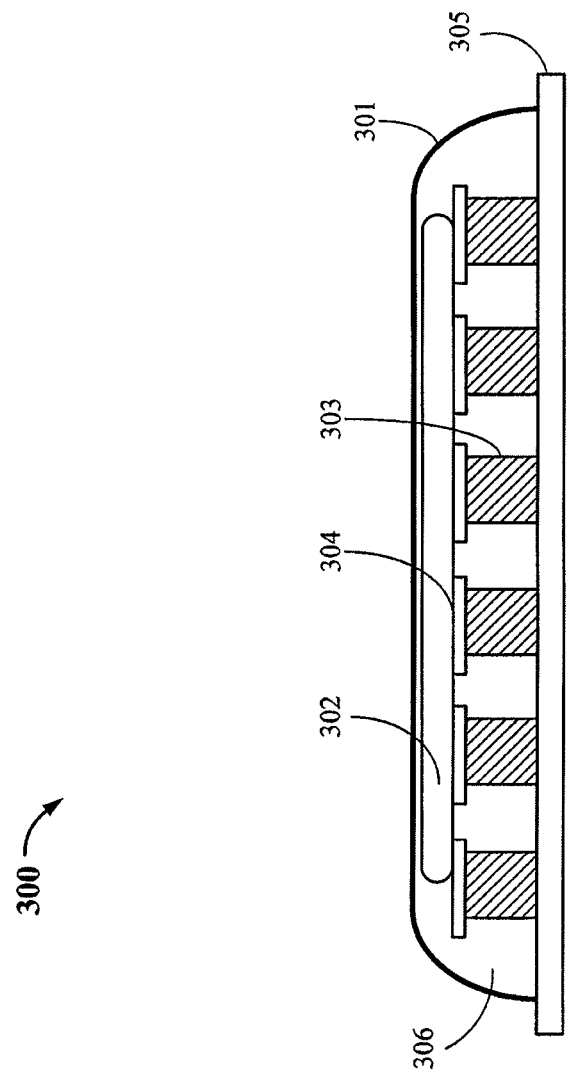
FIG. 3 is a cross-sectional view of a wireless power transfer device, in accordance with an exemplary embodiment.

FIG. 3 is a cross-sectional view of an exemplary construction of modules containing the respective induction coils 116 and 104a of FIG. 1, or the base system transmit circuit 206 or electric vehicle receive circuit 222 of FIG. 2. These modules may herein be described generically as wireless power transfer devices.

The wireless power transfer device 300 of FIG. 3 comprises a casing 301. The casing 301 may be made of any suitable durable material, although in certain embodiments the casing may be made of a rigid or semi-rigid plastic material or other plastic or composite material, for example, polyethylene. Polyethylene may provide impact resistant properties together with a chemical resistance and watertightness which may be suitable for maintaining integrity of the casing in the face of exposure to the range of conditions the wireless power transfer device 300 is likely to experience. Polyethylene can also withstand relatively high temperatures without warping, which may be useful with regard to maintaining the shape of the casing both during manufacture and also in use within environments which experience high temperatures. A medium density polyethylene (MDPE) may provide a relatively inexpensive material for the casing which may also be readily machined. A high density polyethylene (HDPE) may be more easily machined, but could add to the cost of the device 300. It should be appreciated that while polyethylene is discussed as having properties which lend it to being an appropriate material for the casing, this is not intended to be limiting. A person skilled in the art should appreciate that other materials may be used—whether a plastic or otherwise.

The wireless power transfer device 300 further comprises an induction coil 302, positioned within the casing 301. In certain embodiments the coil 302 may be formed from one or more lengths of conducting material, for example Litz wire.

Ferromagnetic antenna cores or magnetically permeable members, shown in FIG. 3 as ferrite blocks 303 may be separated from the coil 302 by an insulating layer 304 to provide electrical separation between the coil 302 and ferrite blocks 303.

A backing plate 305 may be connected to first casing portion 301 to contain the components within the casing 301 and provide additional mechanical strength to the device 300. The backing plate 305 may act as a mounting surface, for example in the case where the wireless power transfer device 300 is the pick-up of an electric vehicle (see for example induction coil 116 of FIG. 1). The backing plate 305 may be made of a conductive material such as, for example, aluminum, copper, or other conductive metal or conductive composite, in order to act as an electromagnetic shield.

The casing 301 may be filled or potted with a settable flowable medium in the form of epoxy resin 306. In one exemplary embodiment, the epoxy resin 306 is a marine grade epoxy with a working viscosity of approximately 725 centipoise. It should be appreciated that this example is not intended to be limiting, and that other suitable settable flowable medium may be implemented with this embodiment of the present disclosure. Reference to a settable flowable medium should be understood to mean any material which may be spread in a fluid manner prior to undergoing a setting process to form a solid. It should be appreciated that the unset flowable medium may include both solid and liquid components—for example solid fibers or particles within a liquid resin.

When set, the epoxy 306 may provide reinforcement within the interior of the casing 301. This may result in improved mechanical strength to the wireless power transfer device 300, particularly in terms of resistance to impact—whether by a vehicle running over a ground-based device, or rocks and other debris striking a device mounted to a vehicle. These compression forces may be more evenly distributed across and resisted by the set epoxy 306, as opposed to purely by the casing 301.

Further, by encasing the induction coil 302 and ferrite blocks 303, the epoxy 306 may provide a waterproofing effect, which is highly desirable in order to assist in enabling the wireless power transfer device 300 to be safely used in wet conditions.

Also, by encasing the ferrite blocks 303 within the epoxy 306, the effects on the electrical characteristics of the wireless power transfer device 300 may be reduced in the event that one or more of the ferrite blocks 303 are cracked. This may be inevitable for devices placed in or on the ground where vehicles can pass over them. The epoxy 306 may serve to substantially hold the form of the blocks 303 such that the properties of the blocks 303, for the purposes of operation of the wireless power transfer device 300, are maintained.

The epoxy 306 may act as an electrical insulator between components within the casing. Further, the epoxy 306 may also improve thermal conductivity of the wireless power transfer device 300 in order to assist with reducing heating of the device 300 during operation.

Figure 4:
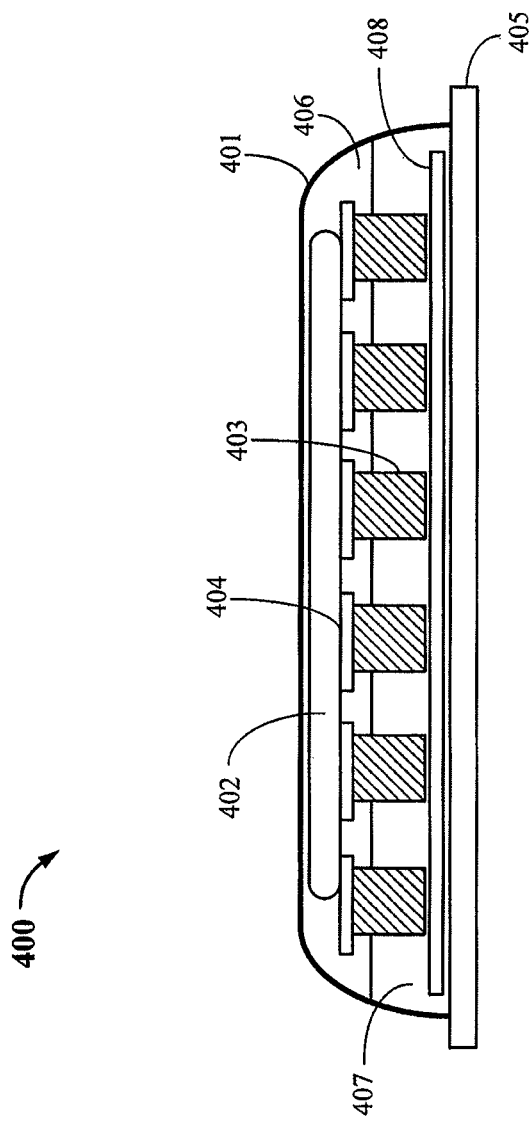
FIG. 4 is a cross-sectional view of a wireless power transfer device, in accordance with another exemplary embodiment.

FIG. 4 illustrates a wireless power transfer device 400 of a similar construction to that of wireless power transfer device 300 of FIG. 3, comprising a casing 401, an induction coil 402, ferrite blocks 403, an insulating layer 404, and a backing plate 405.

In the embodiment illustrated by FIG. 4, a first portion 406 of the casing 401 may be filled or potted with a first settable flowable medium in the form of epoxy resin. In one embodiment, the epoxy resin may be a marine grade epoxy with a working viscosity of approximately 725 centipoise.

A second portion 407 of the casing 401 may further be filled with a second settable flowable medium. In certain embodiments, the second settable flowable medium interfaces with the first settable flowable medium, which may improve the strength of the device 400. The second settable flowable medium may have a lower density than that of the first settable flowable medium. In one embodiment, the second settable flowable medium is epoxy resin mixed with silica beads, which may provide a light, non-conductive, and inexpensive filler material. However, it should be appreciated that other non-conductive/non-magnetic materials may be used in place of either the epoxy resin or silica beads, and may be of a greater density in order to provide other desirable properties. For example, in an alternative embodiment, the first settable flowable medium is epoxy resin mixed with fibrous material. While potentially heavier, the composition may increase the tensile strength of the device 400.

For ease of reference, the first portion 406 and second portion 407 of the casing 401 may now be referred to in the specification as epoxy layers 406 and 407.

In some embodiments, the inductive coil 402 is encased within the first, higher density epoxy layer 406, together with the insulating layer 404, and a portion of the ferrite blocks 403. Such an arrangement may serve to fix these components in place relative to each other and the casing 401 while also improving mechanical strength. To improve mechanical strength in some embodiments, particular care may be required to ensure that air bubbles are not trapped, for example underneath the insulating layer 404, when working the fluid epoxy layer 406 into the casing; such air bubbles may cause weaknesses within the set layer.

In some embodiment, the use of the second, lower-weight epoxy layer 407 reduces the overall weight of the wireless power transfer device 400 compared to embodiments that utilize the higher density epoxy on its own, while still providing a reinforcing structure within the casing 401. In some embodiments, the use of one or more filler materials, such as, for example, the silica beads, may also assist in reducing the cost of the second epoxy layer 407.

In some embodiments, additional material is added to at least one of the epoxy layers 406 and 407 in order to alter the mechanical properties of the layer. For example, a fiber glass sheet 408 may be added between the ferrite blocks 403 and the backing plate 405 to add tensile strength to the device 400 in the region where resistance to flex may be most required. The materials and ratios thereof may be selected according to desired properties of the wireless power transfer device 400. For example, a device for use in a high traffic density area may be permitted a heavier composition in order to achieve the desired mechanical strength. Alternatively, a vehicle-mounted device for use in performance vehicles may sacrifice mechanical strength in order to reduce overall weight.

It should be appreciated that additional portions or layers of settable flowable medium can be used, and such use is herein contemplated by this disclosure. The properties of the settable flowable medium may be selected to suit the components with which the medium makes contact or to achieve the desired properties of the wireless power transfer device 400.

Figure 5:
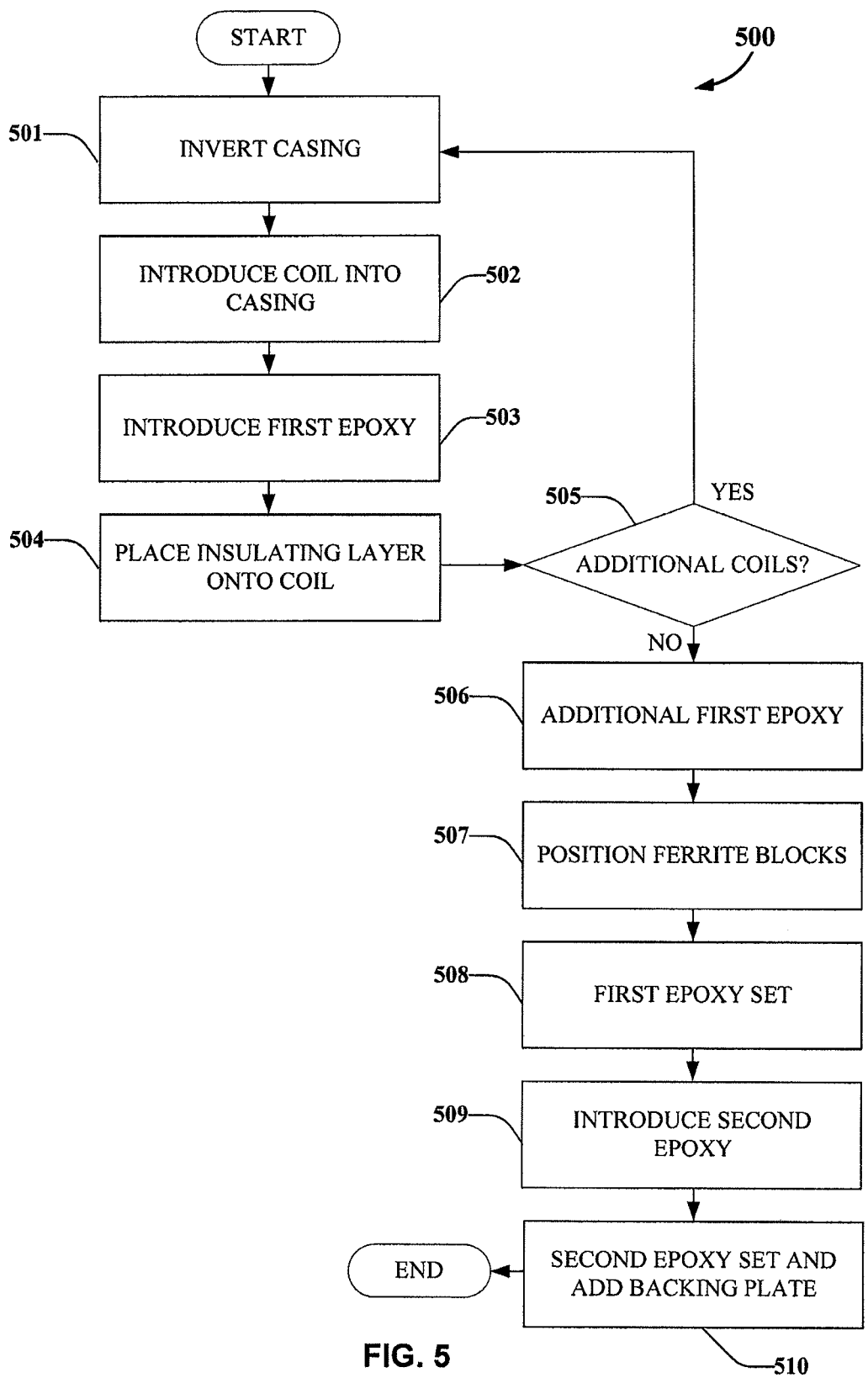
FIG. 5 is a flow chart of an exemplary method for manufacturing a wireless power transfer device, in accordance with exemplary embodiments.

FIG. 5 is a flowchart illustrating an exemplary methodology 500 of manufacturing a wireless power transfer device, such as wireless power transfer device 400 illustrated in FIG. 4. Reference will be made to components in FIG. 4 in the process of describing the methodology 500. It should be appreciated that while a methodology implementing multiple layers of settable flowable medium is described, the process may also be applied to the manufacture of a wireless power transfer device filled with a single settable flowable medium, such as illustrated by FIG. 3.

At 501, the casing 401 is inverted so that the interior of the casing 401 faces upwards. At 502, the inductive coil 402 is introduced into the casing 401. At 503, a sufficient quantity of a first epoxy is introduced into the casing 401 to cover the inductive coil 402. In certain embodiments, a sufficient quantity of first epoxy is introduced to also surround a portion of the ferrite blocks 403. At 504, the insulating layer 404 is placed onto the inductive coil 402.

At 505, steps 502 to 504 may be repeated for additional layers of coils, if so desired. In some embodiments, each coil layer is permitted to set before introduction of an additional coil.

At 506, an additional quantity of the first epoxy is added to cover the insulating layer 404. At 507, the ferrite blocks 403 are positioned in the casing 401 and compressed such that the components are aligned, and a portion of the ferrite blocks 403 may be within the first epoxy. At 508, formation of the first epoxy layer 406, comprising the first epoxy introduced throughout the above-mentioned steps, is complete; any first epoxy within the first epoxy layer 406 that has not yet set is permitted to set.

At 509, a quantity of a second epoxy is introduced into the casing 401, covering the remaining exposed portion of the ferrite blocks 403. In some embodiments, the second epoxy includes silica beads. At 510, the second epoxy layer 407, comprising the second epoxy introduced in step 509, is permitted to set before leveling the second epoxy layer 407 with the edge of the casing 401 and attaching the backing plate 405.

In order to assist in improving the mechanical strength of the wireless power transfer device, particularly with regard to resisting compression forces, it may be desirable to chemically link the casing and epoxy layer(s). While it may be useful to use a material such as polyethylene for the casing of a wireless power transfer device, such as that illustrated by FIG. 4, due to the mechanical properties of the material, the relatively high chemical resistance means that it may be resistant to bonding with a settable flowable medium, such as, for example, epoxy resin. Accordingly, in some embodiments, other materials generally known to those skilled in the art may be selected for the casing and/or the settable flowable medium.

Figure 6:
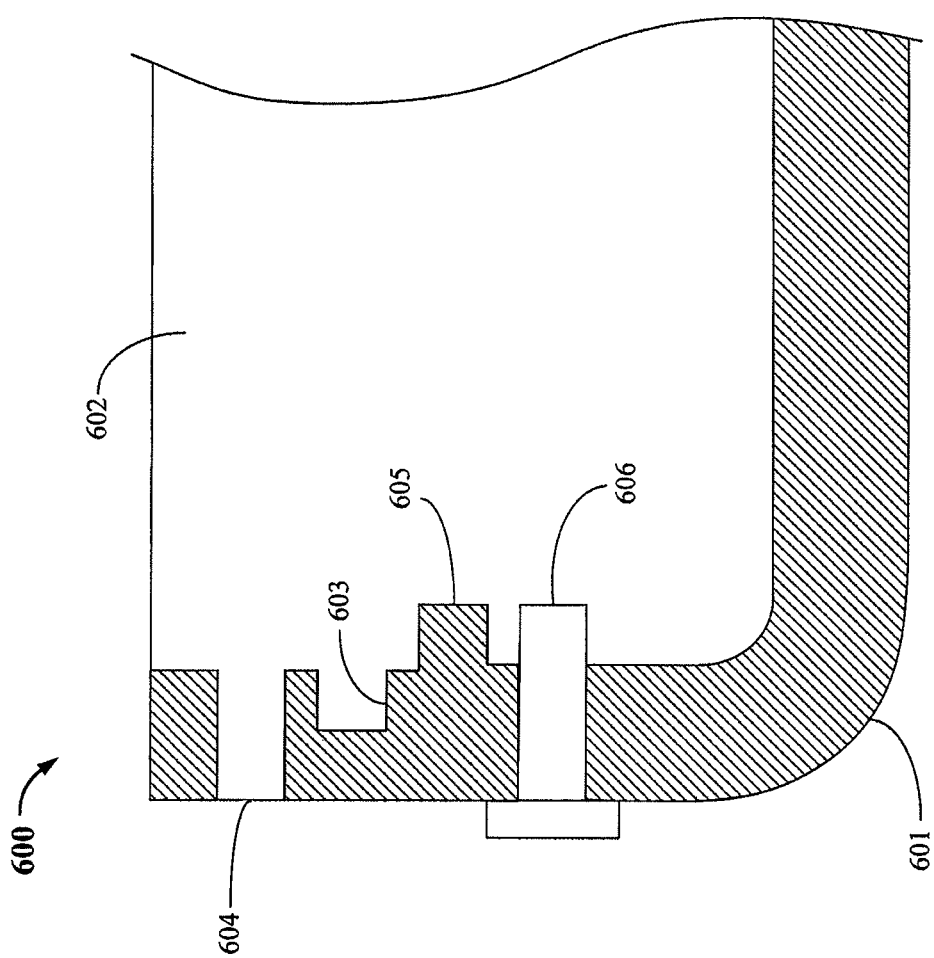
FIG. 6 is a cross-sectional view of a casing for a wireless power transfer device, in accordance with an exemplary embodiment.

FIG. 6 illustrates the use of locating portions in a wireless power transfer device 600 comprising a casing 601 into which a settable flowable medium such as epoxy resin 602 is introduced. Reference to a locating portion should be understood to mean any deviation from the interior surface of the casing; such deviation may help resist movement of a set flowable medium relative to the casing.

For example, the locating portion may be an undercutting portion 603 which receives the fluid epoxy 602. Similarly, the locating portion may be an aperture 604 in the casing 601. Such locating portions may be readily added to the casing in some embodiments, potentially assisting in ease of manufacture. Alternatively, or additionally, the locating portion may be a protrusion 605 formed in the casing 601 and/or an insert 606 placed into an aperture of the casing 601.

Once the epoxy 602 has set, movement of the epoxy 602 relative to the casing 601 is restricted by the mechanical interaction between the epoxy 602 and locating portions 603, 604, 605, or 606. In some embodiments, the insert 606 is made of a material which chemically reacts with the epoxy 602 to provide an additional degree of connection.

It should be appreciated that although a single layer of epoxy is illustrated in FIG. 6, the dual-layer configuration described with reference to FIG. 4 and multi-layer configurations may also be utilized with this aspect of the present disclosure.

It may be generally desirable to maintain a chosen shape of the casing of a wireless power device, such as that illustrated in FIG. 3 or FIG. 4, during manufacture of the device. In particular, it may be desirable to maintain the upper or lower surfaces of the casing as flat because any curve in the casing may be particularly prone to cracking when driven over by heavy vehicles. Where the settable flowable medium introduced into the casing sets through an exothermic process, such as in the case of epoxy resin, this release of heat may cause deformation of the casing. The casing may also be deformed as the result of its manufacture or subsequent handling.

By applying a force to the casing in order to maintain the desired shape during setting of the settable flowable medium, these deformities may be avoided or rectified.

Figure 7:
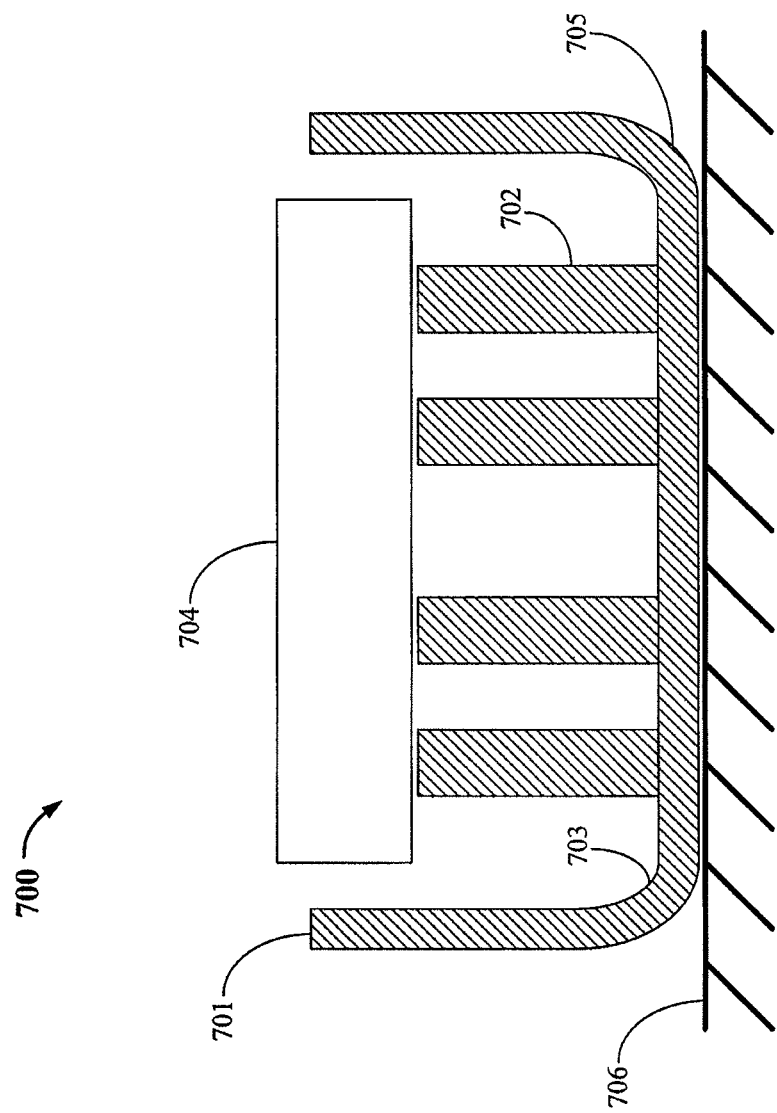
FIG. 7 is a cross-sectional view of a casing for a wireless power transfer device, in accordance with an exemplary embodiment.

FIG. 7 illustrates an embodiment of a casing 701 for use in manufacture of a wireless power transfer device according to an aspect of the present disclosure. The casing 701 may include a plurality of protrusions 702 extending from an interior surface 703 of the casing 701. These protrusions 702 may be used in positioning components to be housed within the casing 701, such as an inductive coil and ferrite blocks (not illustrated).

A weight 704 may be positioned on the protrusions 702, forcing the bottom face 705 of the casing 701 against the surface 706 on which it rests. Once the components have been positioned within the casing 701, and a settable flowable medium (not illustrated) is introduced into the casing 701 and sets, the weight 704 may be removed and the set flowable medium may serve to maintain the desired shape of the casing 701 from thereon.

Figure 8:
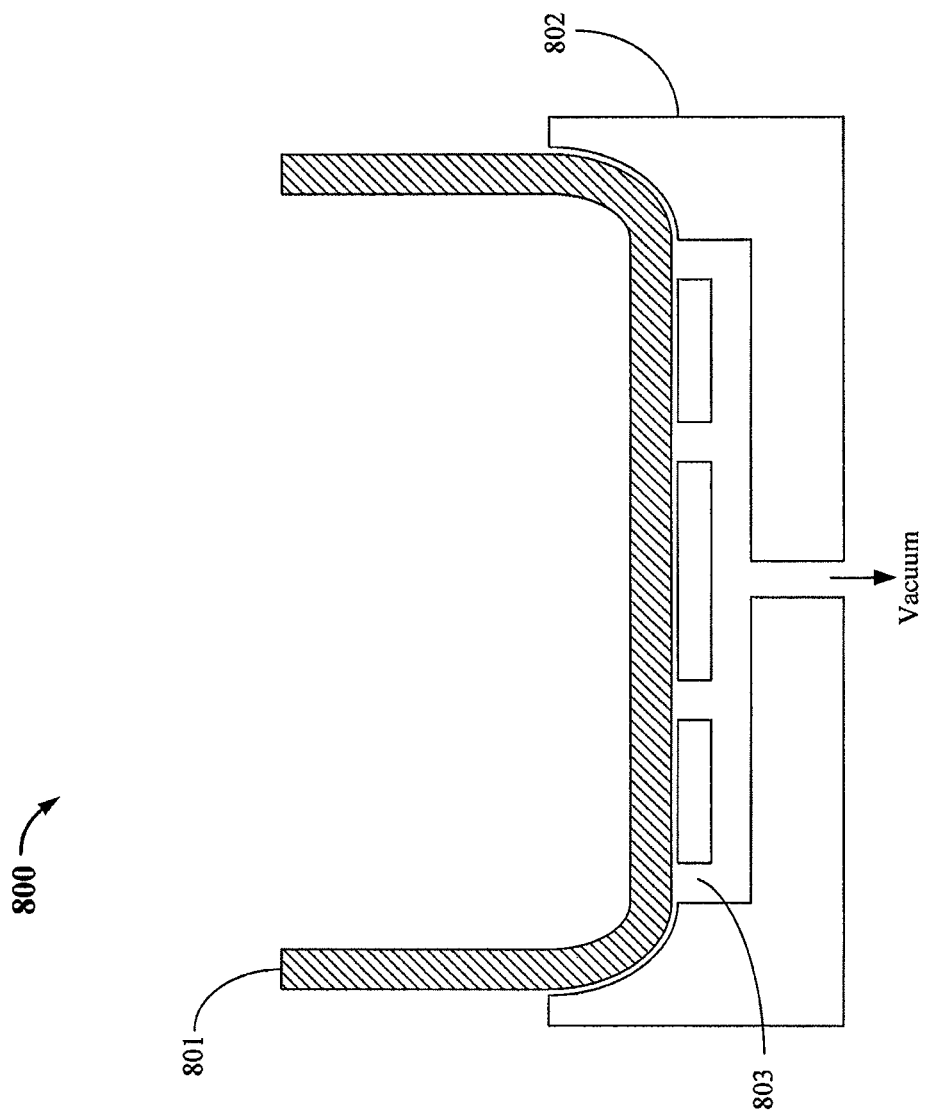
FIG. 8 is a cross-sectional view of an apparatus for use in manufacture of a wireless power transfer device, in accordance with an exemplary embodiment.

FIG. 8 illustrates an alternative method of applying force to a casing 801, using a mold 802 shaped to receive the casing and applying a vacuum to multiple points on the exterior of the casing 801 via apertures 803 in the mold connected to a vacuum source (not illustrated). The mold 802 may also provide a convenient means for locating the casing 801 during introduction of the components to be contained within, such as an inductive coil. On setting of the settable flowable medium, the vacuum may be released.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and features have been described herein. It is to be understood that not necessarily all such advantages may be achieved in accordance with any particular embodiment. Thus, the invention may be embodied or carried out in a manner that achieves or optimizes one advantage or group of advantages as taught herein without necessarily achieving other advantages as may be taught or suggested herein.

While this invention has been described in connection with what is are presently considered to be practical embodiments, it will be appreciated by those skilled in the art that various modifications and changes may be made without departing from the scope of the present disclosure. It will also be appreciated by those of skill in the art that parts mixed with one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Thus, while the present disclosure has described certain exemplary embodiments, it is to be understood that the invention is not limited to the disclosed embodiments, but, on the contrary, is intended to cover various modifications and equivalent arrangements included within the scope of the appended claims, and equivalents thereof.

What is claimed is:

1. A wireless power transfer device comprising:
   a casing;
   a coil housed within the casing and configured to wirelessly receive and transmit power housed within the casing;
   a set first flowable insulating medium contained in a first portion of the casing and surrounding at least part of the coil; and
   a set second flowable insulating medium contained in a second portion of the casing and having a lower density than a density of the set first flowable insulating medium, wherein the set first flowable insulating medium and the set second flowable insulating medium both contact an interior edge of the casing, wherein the set first and second flowable insulating mediums comprise first and second epoxy resins, respectively, and wherein the set second flowable insulating medium further comprises a first non-conductive filler material, the first non-conductive filler material having a higher density than the second epoxy resin.

2. The device of claim 1, wherein the set first flowable insulating medium comprises a second non-conductive filler material having a different density than the first epoxy resin.

3. The device of claim 2, comprising a ferromagnetic, magnetically permeable member, wherein at least part of the ferromagnetic, magnetically permeable member is held within the set second flowable medium.

4. The device of claim 3, further comprising an insulating layer that physically separates the ferromagnetic magnetically permeable member and the coil.

5. The device of claim 1, wherein the casing further comprises a locating portion that physically interacts with the set first flowable insulating medium and resists movement of the set first flowable insulating medium relative to the casing.

6. The device of claim 5, wherein the locating portion comprises a recess or a protrusion in the interior portion of the casing.

7. The device of claim 5, wherein the locating portion comprises an aperture that extends through the casing.

8. The device of claim 5, wherein the casing comprises a chemically resistant material.

9. The device of claim 5, wherein the casing comprises polyethylene.

10. A method for wirelessly transferring power with a wireless power transfer device, the method comprising:
coupling a wireless power transfer device to a magnetic field via an induction coil, the induction coil housed within a casing that contains a set first flowable insulating medium in a first portion of the casing at least partially surrounding at least a part of the induction coil and a set second flowable insulating medium in a second portion of the casing, the set second flowable insulating medium having a lower density than a density of the set first flowable insulating medium, the set first flowable insulating medium and the set second flowable insulating medium both contacting an interior edge of the casing, the set first and second flowable insulating mediums comprising first and second epoxy resins, respectively, the set second flowable insulating medium further comprising a first non-conductive filler material, and the first non-conductive filler material having a higher density than the second epoxy resin; and
transferring power via the magnetic field.

11. The method of claim 10, wherein the set first flowable insulating further comprises a second non-conductive filler material having a different density than the first epoxy resin.

12. The method of claim 11, wherein at least part of a ferromagnetic electromagnetically permeable member is held within the set second flowable insulating medium.

13. The method of claim 12, wherein the casing further comprises an insulating layer physically separating the ferromagnetic magnetically permeable member and the coil.

14. The method of claim 10, wherein the casing comprises a locating portion that physically interacts with the set first flowable insulating medium and resists movement of the set first flowable insulating medium relative to the casing.

15. The method of claim 14, wherein the locating portion comprises a recess or a protrusion in the interior portion of the casing.

16. The method of claim 14, wherein the locating portion comprises an aperture that extends through the casing.

17. The method of claim 14, wherein the casing comprises a chemically resistant material.

18. The method of claim 14, wherein the casing comprises polyethylene.

19. A wireless power transfer device comprising:
means for wirelessly receiving power;
means for wirelessly transmitting power;
first insulating means for holding the means for wirelessly receiving power and the means for wirelessly transmitting power;
second insulating means for holding; and
means for housing the wirelessly receiving means, the wirelessly transmitting means, the first insulating holding means, and the second insulating holding means, the housing means having a shape and being in contact with the first and second insulating means,
the first insulating holding means being contained in a first portion of the housing means and surrounding the wirelessly receiving means and the wirelessly transmitting means, the second insulating holding means being contained in a second portion of the housing means, the second insulating holding means having a lower density than a density of the first insulating holding means,
wherein the first and second insulating holding means comprise first and second epoxy resins, respectively, and wherein the second insulating holding means further comprises a first non-conductive filler material, the first non-conductive filler material having a higher density than the second epoxy resin.

20. The device of claim 19, wherein the first insulating holding means a second non-conductive filler material having a different density than the first epoxy resin.

21. The device of claim 20, comprising a ferromagnetic magnetically permeable member, wherein at least part of the ferromagnetic magnetically permeable member is held within said second insulating holding means.

22. The device of claim 21, further comprising insulating means physically separating the ferromagnetic magnetically permeable member and the wirelessly receiving power means and the wirelessly transmitting power means.

23. The device of claim 19, wherein the housing means comprises a locating portion configured to physically interact with the first insulating holding means and resist movement of the first insulating holding means in relation to the housing means.

24. The device of claim 23, wherein the locating portion comprises one or more of a recess or a protrusion in the interior portion of the casing.

25. The device of claim 23, wherein the locating portion comprises an aperture that extends through the housing means.

26. The device of claim 23, wherein the encasing means comprises a chemically resistant material.

* * * * *